Patented July 23, 1929.

1,722,040

UNITED STATES PATENT OFFICE.

CHRISTOPH DÜRSCH, OF NUREMBERG, GERMANY.

WELDING AND SOLDERING COMPOSITION.

No Drawing. Application filed September 6, 1928, Serial No. 304,387, and in Germany September 10, 1927.

This invention relates to a novel welding and soldering composition in the form of a powder or paste which may be used for all metals and more especially for soldering or welding together either like or different metals.

Heretofore it had been necessary to provide special welding or soldering powders or pastes for metals of the same kind and for metals of a different kind.

According to my invention this drawback which is inherent to the heretofore used welding or soldering powders or pastes will be completely avoided. According to my invention there is provided a single welding and soldering powder or paste which may be used for all purposes of welding or hard-soldering of like or different metals with each other.

The novel welding and soldering composition according to my invention may therefore be used for welding or hard-soldering of the following materials: cast iron, aluminum, copper, brass, bronze, with each other as well as brass with iron, copper with iron, cast iron with iron of any kind, copper with aluminum, and the like.

The welding and soldering composition according to my invention may be produced from two mixtures and consists of a first mixture comprising one part of borax or one part of borax and soda which is molten with like parts of metals, the composition thus obtained being thereupon comminuted and pulverized, and of a second mixture composed of one part of borax-powder, one part of pulverized soda and one fifth part of chemically pure common salt (sodium chloride) or vegetable salt (quinine).

The composition of the first mixture may be chosen as follows for the several metals:

| For each part of metal | Brass and lead | Brass, lead, and aluminum | Copper and aluminum | Copper, tin, and aluminum |
|---|---|---|---|---|
| One part (of borax or borax and soda). | Borax. | Borax. | Borax and soda. | Borax and soda. |

The constituents of one of these first mixtures are molten together in a pan and the lump of mass thus obtained is broken into small pieces and pulverized, while the metal is advantageously added in the form of chips. It may be noted that a small remainder of liquid will remain in the melting pan, this remainder being used as follows:

The second mixture is intimately mixed with the first mixture with the addition of the said remainder of liquid from the melting pan and with the addition of water, so that a mass of pasty consistency and great durability will be obtained which mass may be packed in boxes or the like.

This soldering powder or paste may be used in a very economical manner, the quantities being chosen in accordance with ordinary practice. Instead of borax and soda in the second mixture also sulphate of potassium and phosphate of ammonia may be used so that this modified second mixture consists of one part of sulphate of potassium, one part of phosphate of ammonia, and one fifth part of chemically pure common salt (sodium chloride) or vegetable salt (quinine).

The advantages which are obtained by employing the novel welding and soldering powder or paste are quite enormous and the durability and strength of the connection of the several metal pieces when welded or soldered to each other by means of my present composition will greatly surpass the durability and strength of the connections made by the aid of heretofore known compositions.

It may especially be noted that when employing some of the aluminum welding powders which at the present time are obtainable on the market there will be obtained a white crust or scab at the welding point subsequent to the welding process, said crust or scab discharging water and bubbles after a very short time or as it is sometimes called will become "tuberculous". In this case it also frequently happens that the metal-piece inserted by welding will again break off after some longer time. This will be positively prevented when employing the new welding and soldering composition and the welding or soldering points will be completely homogeneous and of a bright outer surface.

A further essential advantage connected with my new welding and soldering composition consists therein that in case of fracture of a hard-soldered connection or of a hard-soldered connecting sleeve as used, for instance, with bicycle and motor-vehicle frames, it will no more be necessary to exchange or add any parts. By the aid of my new welding and soldering composition it will be possible to apply autogeneous welding immediately to the place of fracture of the hard-solder or of the connecting sleeve. This had heretofore not been possible at all, since with known compositions by the process of welding a fracture or gap is produced in every case. Although it is possible according to present practice to hard-solder upon welded parts it is not possible at the present time to subsequently weld hard-soldered points of fracture with each other.

The use of my novel welding and hard-soldering composition may further be briefly explained by the following example:

A rusty flat iron-bar is fastened in horizontal position within a vice, thereupon the new welding and soldering composition is applied to said iron-bar and a small piece of brass-wire placed upon said welding composition. The work-piece is thereupon heated from below by means of a flame to such an extent until the welding composition will melt together with said brass-wire at the surface of said work-piece. Thereupon the latter is cooled off, this causing the iron-scale to break off at once. The previously rusty iron-bar will thereupon be perfectly coated with pure metallic brass, this being a proof for the fact that my novel welding and soldering composition is possessed of the property of absolutely cleaning and permanently uniting metals.

Upon the thus prepared work-piece now, for instance, a likewise rusty or oxidized piece of metal may be welded by interposing a small piece of charcoal intermediate the two work-pieces to be united with each other and thereupon welding said two work-pieces together. In this case the iron-scale which is injurious to files will fall off automatically and the welded iron mass will remain at the bottom and the brass layer at the top.

A fracture or the like at the first hard-soldered and thereupon welded place will now no more be possible even if very heavy strains are imposed thereon. In like manner also all other metals may be welded or hard-soldered with each other, such as aluminum, copper, brass, iron, bronze, all kinds of steel, red-brass, so-called Nirosta-steel, silicon metal, pressure-castings made from aluminum, and the like.

More especially, by employing my new welding and soldering composition it will be possible to weld and hard-solder cast-iron in such a way that the welded or soldered points will be fully soft to easily permit application of a file, without possessing the slightest porous places even in case completely rusty old cast-iron is used, such as for instance cast-iron pieces of iron stoves or the like.

My new welding and soldering composition may also be used for welding or soldering silver and gold with each other by employing an additional wire of silver-solder during the process of welding or soldering. In like manner all the different kinds of aluminum-alloys, such as for instance "duralumin", pressure-cast aluminum and the like may be advantageously welded or soldered with each other by means of my novel welding and soldering composition.

I claim:

A welding and soldering composition for uniting like or different metals with each other, said composition consisting of a mixture obtained by melting together and subsequently pulverizing one part of brass, one part of lead and one part of borax, said mixture being thereupon mixed with a second mixture consisting of one part of powdered borax, one part of pulverized soda and one fifth part of chemically pure salt, said two mixtures being mixed with each other and worked up into a paste with the addition of water and the liquid which remains during melting of said first mentioned mixture.

In testimony whereof I affix my signature.

CHRISTOPH DÜRSCH.